(12) United States Patent
You et al.

(10) Patent No.: US 10,861,132 B2
(45) Date of Patent: Dec. 8, 2020

(54) METHOD AND APPARATUS FOR VIRTUAL REALITY CONTENT STITCHING CONTROL WITH NETWORK BASED MEDIA PROCESSING

(71) Applicant: Nokia Technologies Oy, Espoo (FI)

(72) Inventors: Yu You, Kangasala (FI); Sujeet Shyamsundar Mate, Tampere (FI); Emre Baris Aksu, Tampere (FI); Kashyap Kammachi-Sreedhar, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/507,459

(22) Filed: Jul. 10, 2019

(65) Prior Publication Data
US 2020/0020077 A1    Jan. 16, 2020

Related U.S. Application Data

(60) Provisional application No. 62/696,579, filed on Jul. 11, 2018.

(51) Int. Cl.
*H04N 7/00* (2011.01)
*G06T 3/40* (2006.01)
*H04N 5/262* (2006.01)
*H04N 5/232* (2006.01)
*H04L 29/06* (2006.01)

(52) U.S. Cl.
CPC ....... *G06T 3/4038* (2013.01); *H04N 5/23238* (2013.01); *H04N 5/2624* (2013.01); *H04L 67/38* (2013.01)

(58) Field of Classification Search
USPC .......................................................... 348/38
See application file for complete search history.

(56) References Cited

U.S. PATENT DOCUMENTS

| | | | |
|---|---|---|---|
| 2016/0269717 A1* | 9/2016 | Kato | H04N 13/243 |
| 2017/0006219 A1 | 1/2017 | Adsumilli et al. | |
| 2018/0091866 A1* | 3/2018 | Sun | H04N 21/238 |
| 2018/0225805 A1* | 8/2018 | Brandt | H04N 5/2258 |
| 2019/0068879 A1* | 2/2019 | Bao | H04N 5/2628 |
| 2019/0200083 A1* | 6/2019 | Pio | H04N 21/4728 |

OTHER PUBLICATIONS

OZO Live User Guide, Nokia https://docs.ozo.nokia.com/learn/OZO_Live_User_Guide_v1.3.0.pdf (Sep. 25, 2017) 18 pages.

(Continued)

*Primary Examiner* — Behrooz M Senfi
(74) *Attorney, Agent, or Firm* — Alston & Bird LLP

(57) ABSTRACT

A method, apparatus and computer program product provide a signaling mechanism that could be utilized in conjunction with a media interface and exchange mechanism in a media processing pipeline defined in Moving Picture Experts Group-I (MPEG-I) Network-based media processing (NBMP). In particular, a method, apparatus and computer program product provide a NBMP media interface mechanism that enables virtual reality (VR) stitching within an NBMP-enabled system independent of stitching algorithm used.

16 Claims, 13 Drawing Sheets

(56) References Cited

OTHER PUBLICATIONS

Mistika VR-SGO, [online] [retrieved Sep. 24, 2019]. Retrieved from the Internet: https://web.archive.org/web/20190403040539/https://www.sgo.es/mistika-vr/ (Apr. 3, 2019) 7 pages.
Calibrating Stitched Videos with VRWorks 360 Video SDK | NVIDIA Developer Blog, [online] [retrieved Aug. 29, 2019]. Retrieved from the Internet: https://devblogs/nvidia.com/calibrating-videos-vrworks-360-video/ (dated Jan. 3, 2018) 8 pages.
International Search Report and Written Opinion for Application No. PCT/FI2019/050538 dated Oct. 14, 2019, 14 pages.
Marks, D. L. et al., *Feedback Stitching for Gigapixel Video*, Journal of Electronic Imaging, 24(6) (Nov./Dec. 2015) 063006-1-063006-14.
You, Y. et al., *Supplementary Use Case: 360 VR Stitching*, Coding of Moving Pictures and Audio, MPEG Document Management System, ISO/IEC JTC1/SC29/WG11 MPEG2018/M42091v3 (Jan. 2018) 3 pages.
OZO+Post Production Workflow, Nokia (Aug. 2017) 59 pages.
Nokia OZO Creator, Stitching & Encoding (youtube) (Jan. 18, 2017) 1 page.
Reader, Writer and Effect Nodes [online] [retrieved Nov. 1, 2019]. Retrieved from the Internet: http://www.assimilatesupport.com/akb/KnowledgebaseArticle50985.aspx. (dated Jun. 20, 2018) 3 pages.
Scratch VR Suite [online ] [retrieved Nov. 1, 2019]. Retrieved from the Internet: http://www.assimilatesupport.com/akb/KnowledgebaseArticle50812.aspx. (dated Jun. 8, 2018) 8 pages.

\* cited by examiner

METHOD AND APPARATUS FOR VIRTUAL REALITY CONTENT STITCHING CONTROL WITH NETWORK BASED MEDIA PROCESSING

The present application claims priority to U.S. Provisional Application Ser. No. 62/696,579, titled "METHOD AND APPARATUS FOR VIRTUAL REALITY CONTENT STITCHING CONTROL WITH NETWORK BASED MEDIA PROCESSING," filed Jul. 11, 2018, the contents of which are incorporated herein by reference in their entirety.

TECHNICAL FIELD

An example embodiment relates generally to video stitching in network-based media processing.

BACKGROUND

Panoramic (360 degree) stitching is a process of constructing a panoramic image, either monoscopic or stereoscopic, by combining imagery from multiple camera lens positions. Given a constraint rig configuration with multiple camera lens, left and right perspective equirectangular images are created from strips from adjacent cameras with the help of known camera calibration parameters and a desired stereoscopic output disparity. A problem when stitching multiple images is that parallax leads to disturbing artefacts (e.g., seams) that may appear as discontinuities between the stitched strips. Some approaches for addressing this problem include blending between strips using different strategies such as fast linear gradient-domain approaches, or slow approaches such as depth or optical flow.

In the stitching process, certain information such as camera parameters, and objective and subjective requirements for the stitching process are required. In addition, the content used for stitching may be fragmented and heterogeneous. For example, some content made available for stitching could be captured from a single-body camera, multiple fish eye cameras, or a set of cameras on a rig. The cameras from different sources may not be synchronized and may not be formatted uniformly. Therefore, input source content parameters that indicate the content properties for content from different sources are important for the stitching process in order to perform the stitching efficiently and with minimal amount of errors.

BRIEF SUMMARY

A method, apparatus and computer program product are provided in accordance with an example embodiment to provide a signaling mechanism that could be utilized in conjunction with a media interface and exchange mechanism in a media processing pipeline defined in Moving Picture Experts Group-I (MPEG-I) Network-based media processing (NBMP). In particular, a method, apparatus and computer program product are provided in accordance with an example embodiment to provide a NBMP media interface mechanism that enables virtual reality (VR) stitching within an NBMP-enabled system independent of stitching algorithm used.

In one example embodiment, a method is provided that includes capturing media content. The media content comprises one or more videos. The method further includes transferring the media content in accordance with a network-based media processing interface mechanism. The network-based media processing interface mechanism defines a set of stitching input parameters to be transferred along with the media content.

In some implementations of such a method, the network-based media processing interface mechanism defines a set of ingestion content properties to be transferred along with the media content. In some embodiments, the set of ingestion content properties include contributing source content information. In some embodiments, the set of stitching input parameters include seam position selection criteria and convergence point selection criteria. In some embodiments, the seam position selection criteria include a default seam position, a seam thickness, and a seam extent of freedom.

In another example embodiment, an apparatus is provided that includes at least one processor and at least one memory including computer program code for one or more programs with the at least one memory and the computer program code configured to, with the at least one processor, cause the apparatus at least to capture media content. The media content comprises one or more videos. The computer program code is further configured to, with the at least one processor, cause the apparatus to transfer the media content in accordance with a network-based media processing interface mechanism. The network-based media processing interface mechanism defines a set of stitching input parameters to be transferred along with the media content.

In some implementations of such an apparatus, the network-based media processing interface mechanism defines a set of ingestion content properties to be transferred along with the media content. In some embodiments, the set of ingestion content properties include contributing source content information. In some embodiments, the set of stitching input parameters include seam position selection criteria and convergence point selection criteria. In some embodiments, the seam position selection criteria include a default seam position, a seam thickness, and a seam extent of freedom.

In another example embodiment, an apparatus is provided that includes means for capturing media content. The media content comprises one or more videos. The apparatus further includes means for transferring the media content in accordance with a network-based media processing interface mechanism. The network-based media processing interface mechanism defines a set of stitching input parameters to be transferred along with the media content.

In some implementations of such an apparatus, the network-based media processing interface mechanism defines a set of ingestion content properties to be transferred along with the media content. In some embodiments, the set of ingestion content properties include contributing source content information. In some embodiments, the set of stitching input parameters include seam position selection criteria and convergence point selection criteria. In some embodiments, the seam position selection criteria include a default seam position, a seam thickness, and a seam extent of freedom.

In another example embodiment, a computer program product is provided that includes at least one non-transitory computer-readable storage medium having computer executable program code instructions stored therein with the computer executable program code instructions comprising program code instructions configured, upon execution, to capture media content. The media content comprises one or more videos. The computer executable program code instructions comprising program code instructions configured, upon execution, to transfer the media content in accordance with a network-based media processing interface mechanism. The network-based media processing interface mechanism defines a set of stitching input parameters to be transferred along with the media content.

In some implementations of such a computer program product, the network-based media processing interface mechanism defines a set of ingestion content properties to be transferred along with the media content. In some embodiments, the set of ingestion content properties include contributing source content information. In some embodiments, the set of stitching input parameters include seam position selection criteria and convergence point selection criteria. In some embodiments, the seam position selection criteria include a default seam position, a seam thickness, and a seam extent of freedom.

In another example embodiment, a method is provided that includes receiving media content. The media content comprises one or more videos and is transferred in accordance with a network-based media processing interface mechanism. The network-based media processing interface mechanism defines a set of stitching input parameters to be transferred along with the media content. The method further includes stitching the one or more videos into one or more stitched videos.

In some implementations of such a method, the network-based media processing interface mechanism defines a set of ingestion content properties to be transferred along with the media content. In some embodiments, the set of ingestion content properties include contributing source content information. In some embodiments, the set of stitching input parameters include seam position selection criteria and convergence point selection criteria. In some embodiments, the seam position selection criteria include a default seam position, a seam thickness, and a seam extent of freedom.

In another example embodiment, an apparatus is provided that includes at least one processor and at least one memory including computer program code for one or more programs with the at least one memory and the computer program code configured to, with the at least one processor, cause the apparatus at least to receive media content. The media content comprises one or more videos and is transferred in accordance with a network-based media processing interface mechanism. The network-based media processing interface mechanism defines a set of stitching input parameters to be transferred along with the media content. The computer program code is further configured to, with the at least one processor, cause the apparatus at least to stitch the one or more videos into one or more stitched videos.

In some implementations of such an apparatus, the network-based media processing interface mechanism defines a set of ingestion content properties to be transferred along with the media content. In some embodiments, the set of ingestion content properties include contributing source content information. In some embodiments, the set of stitching input parameters include seam position selection criteria and convergence point selection criteria. In some embodiments, the seam position selection criteria include a default seam position, a seam thickness, and a seam extent of freedom.

In another example embodiment, an apparatus is provided that includes means for receiving media content. The media content comprises one or more videos and is transferred in accordance with a network-based media processing interface mechanism. The network-based media processing interface mechanism defines a set of stitching input parameters to be transferred along with the media content. The apparatus further includes means for stitching the one or more videos into one or more stitched videos.

In some implementations of such an apparatus, the network-based media processing interface mechanism defines a set of ingestion content properties to be transferred along with the media content. In some embodiments, the set of ingestion content properties include contributing source content information. In some embodiments, the set of stitching input parameters include seam position selection criteria and convergence point selection criteria. In some embodiments, the seam position selection criteria include a default seam position, a seam thickness, and a seam extent of freedom.

In another example embodiment a computer program product is provided that includes at least one non-transitory computer-readable storage medium having computer executable program code instructions stored therein with the computer executable program code instructions comprising program code instructions configured, upon execution, to receive media content. The media content comprises one or more videos and is transferred in accordance with a network-based media processing interface mechanism. The network-based media processing interface mechanism defines a set of stitching input parameters to be transferred along with the media content. The computer executable program code instructions further includes program code instructions configured, upon execution, to stitch the one or more videos into one or more stitched videos.

In some implementations of such a computer program product, the network-based media processing interface mechanism defines a set of ingestion content properties to be transferred along with the media content. In some embodiments, the set of ingestion content properties include contributing source content information. In some embodiments, the set of stitching input parameters include seam position selection criteria and convergence point selection criteria. In some embodiments, the seam position selection criteria include a default seam position, a seam thickness, and a seam extent of freedom.

BRIEF DESCRIPTION OF THE DRAWINGS

Figure 1:
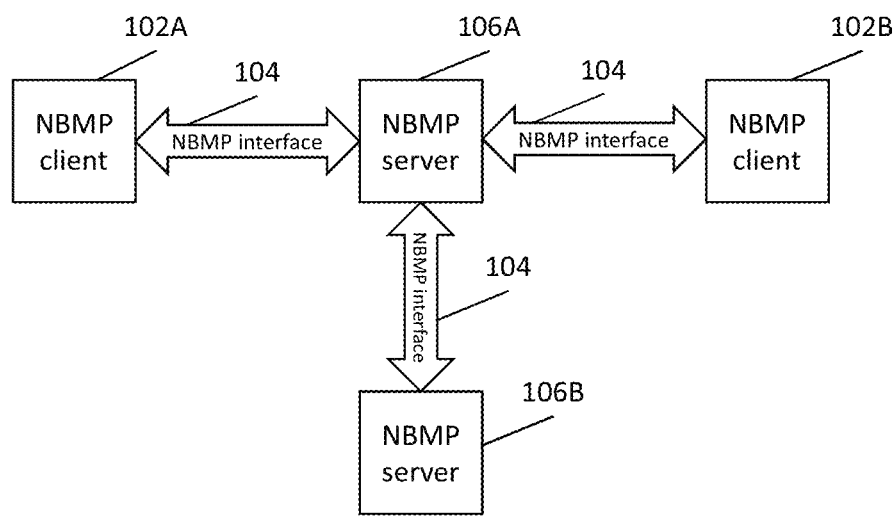
Figure 2:
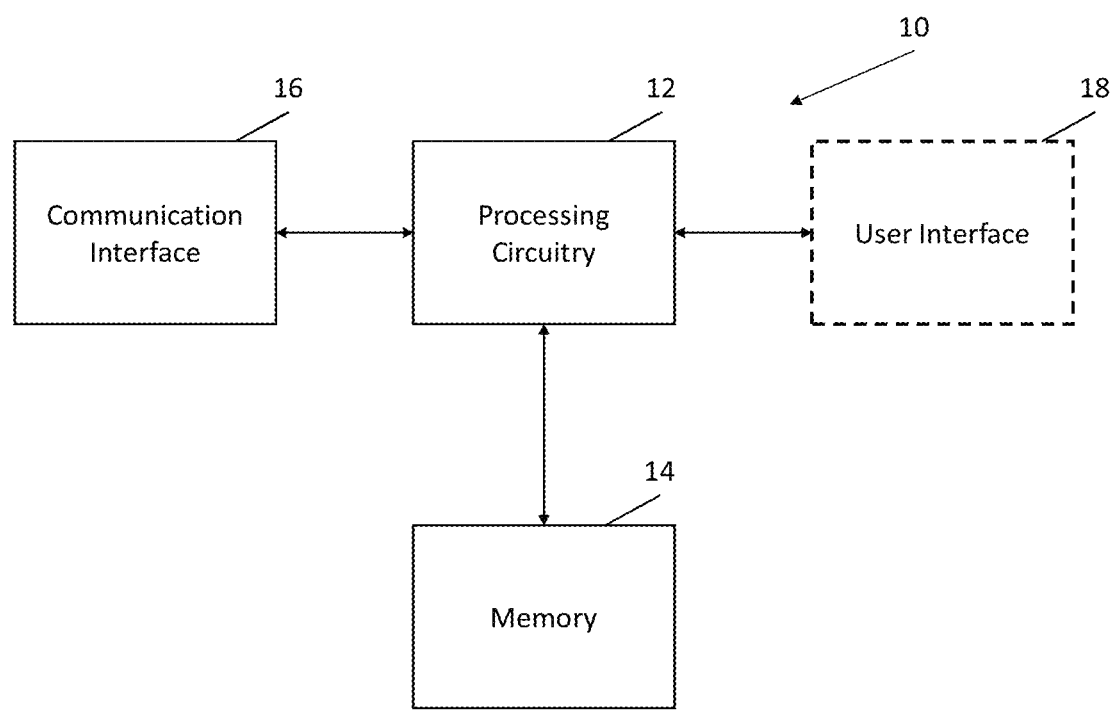
Figure 3:
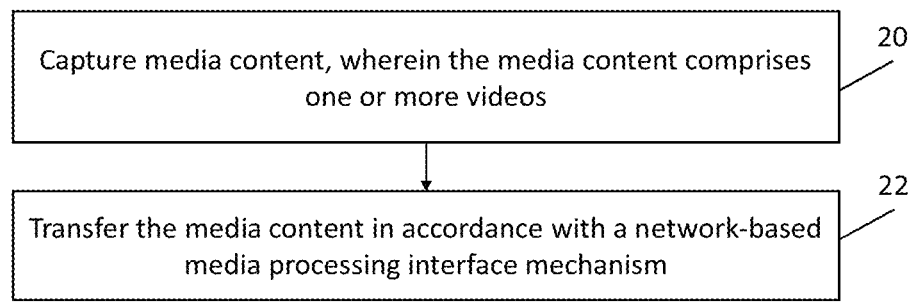
Figure 4:
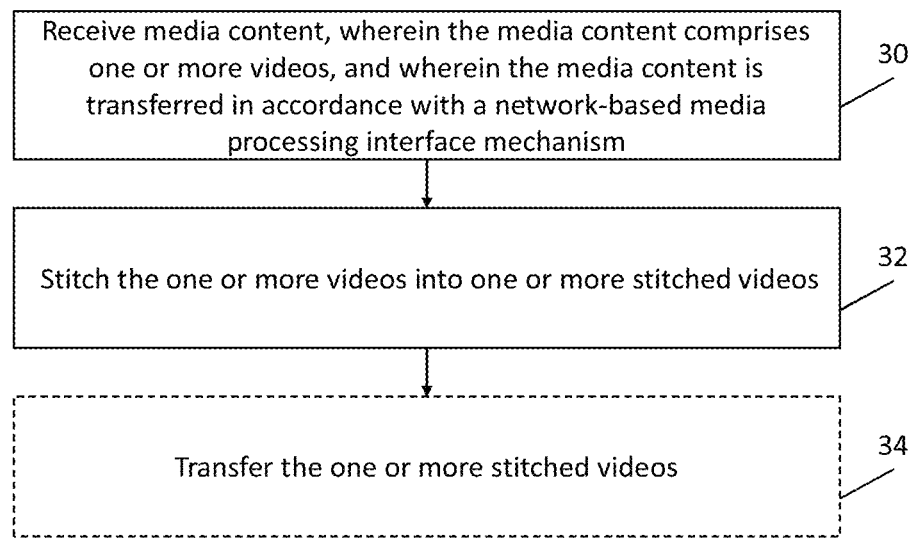
Figure 5:
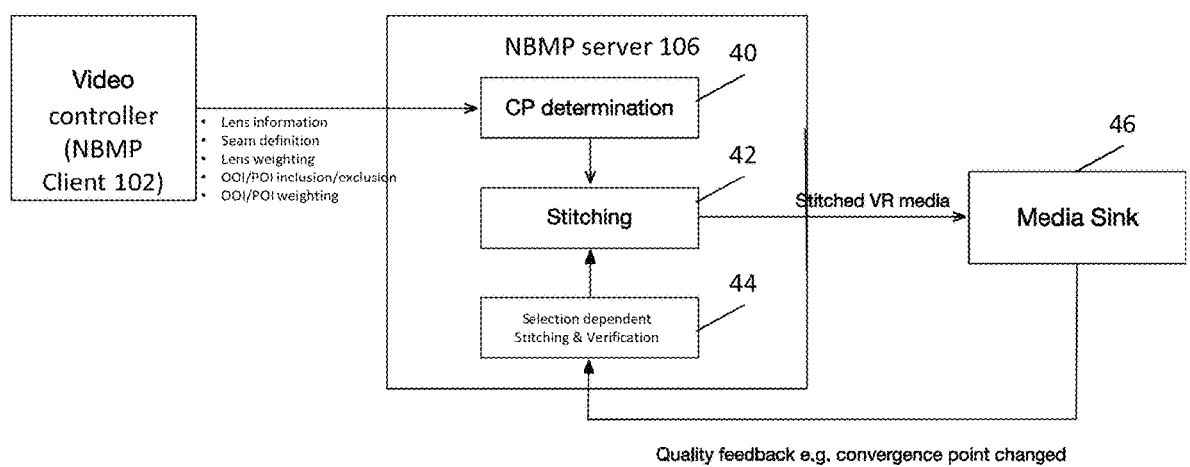
Figure 6:
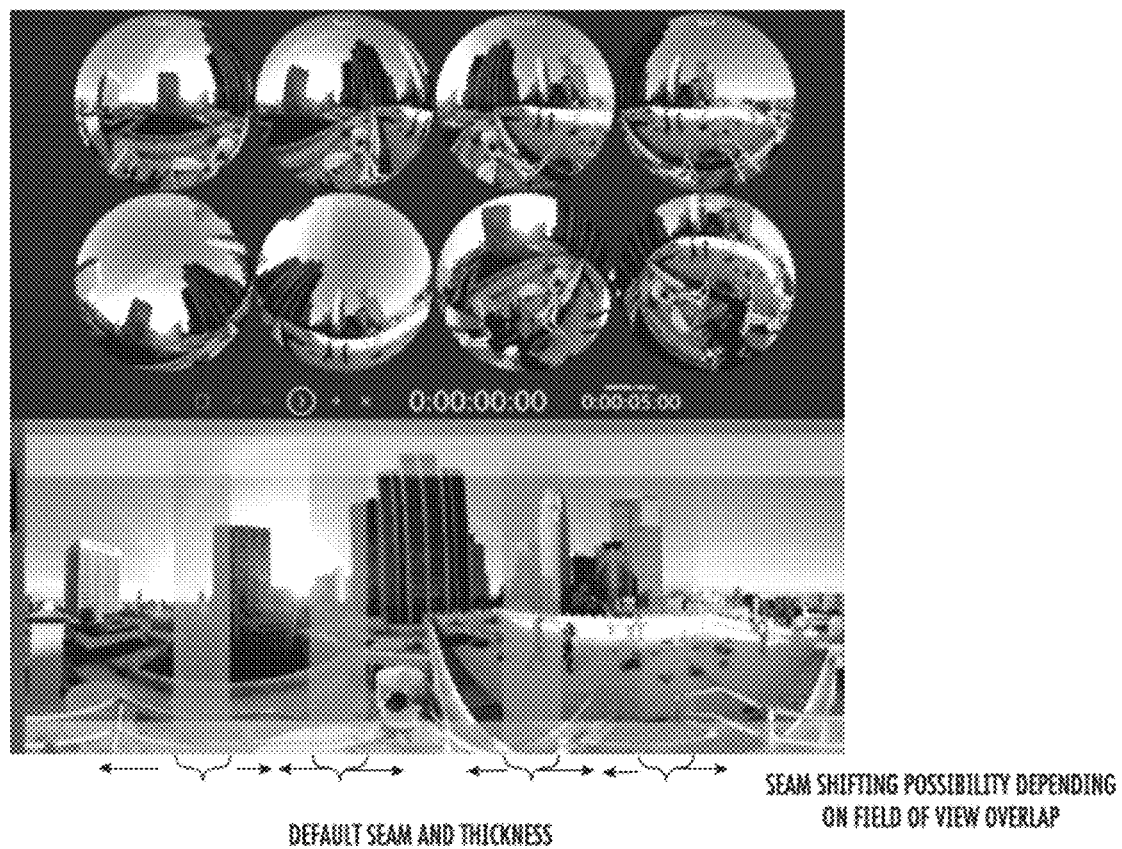
Figure 7A:
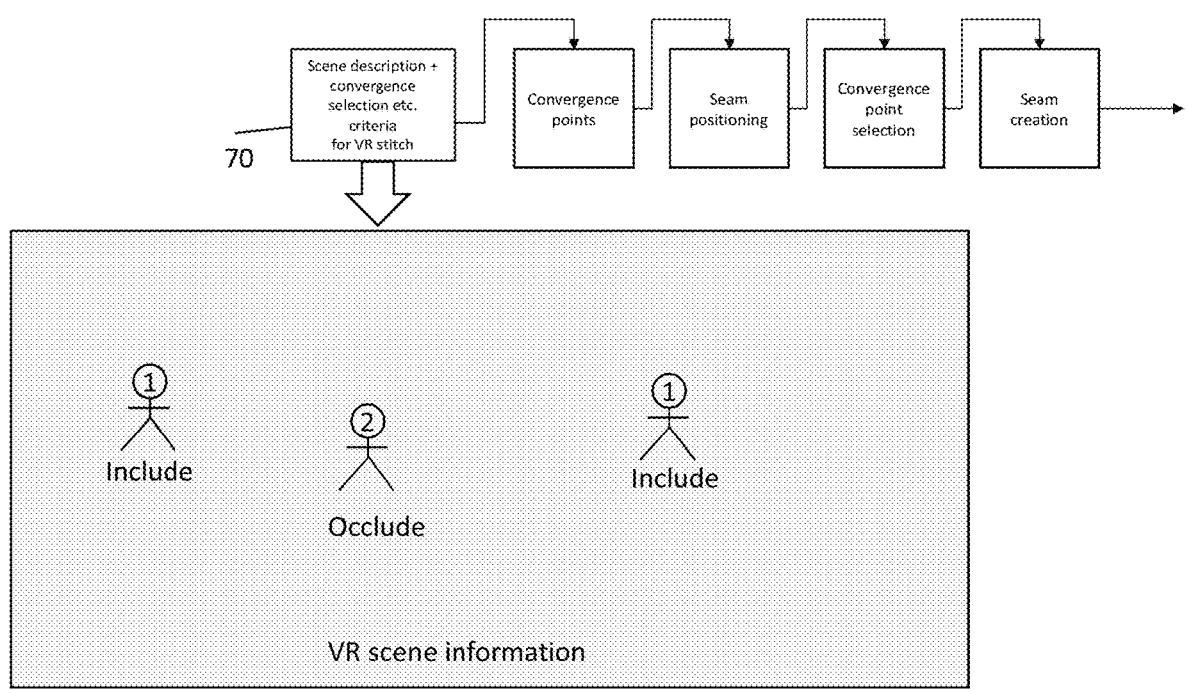
Figure 7B:
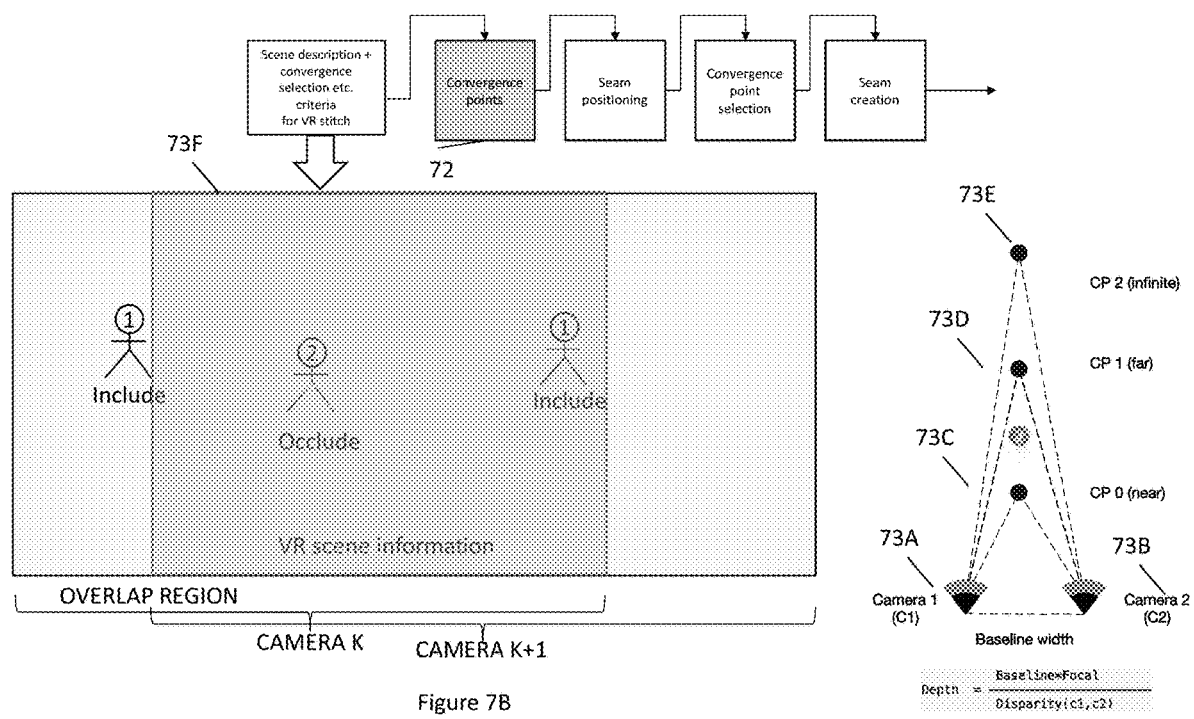
Figure 7C:
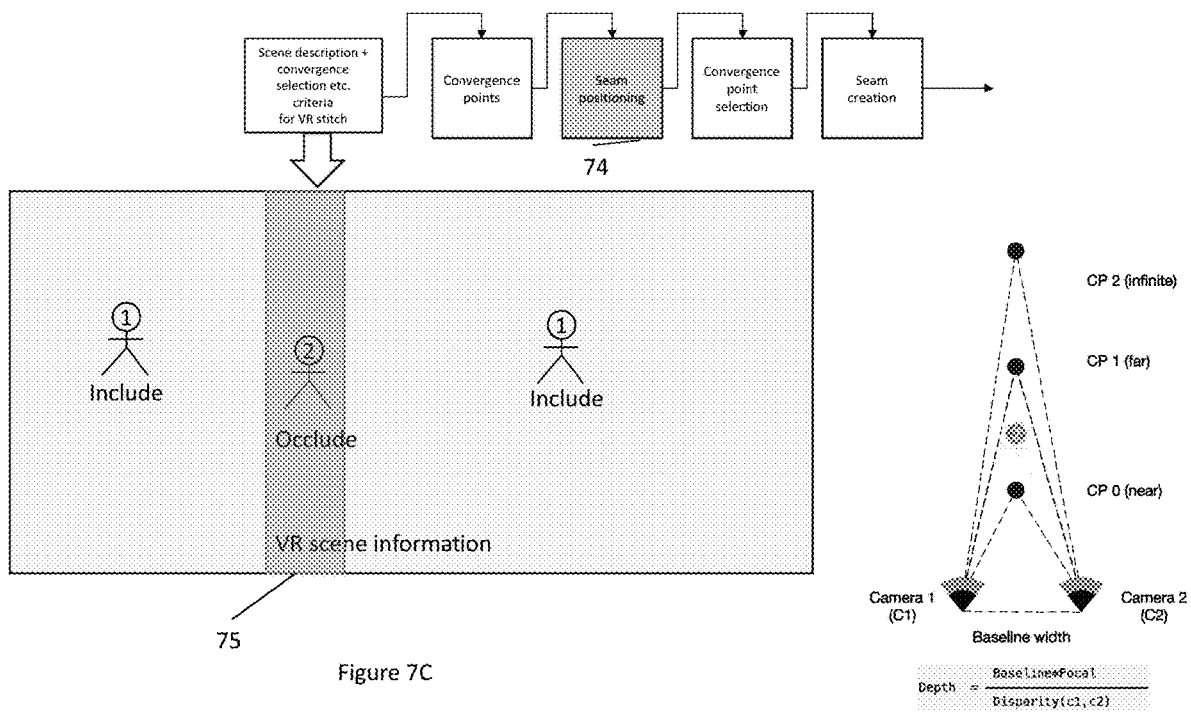
Figure 7D:
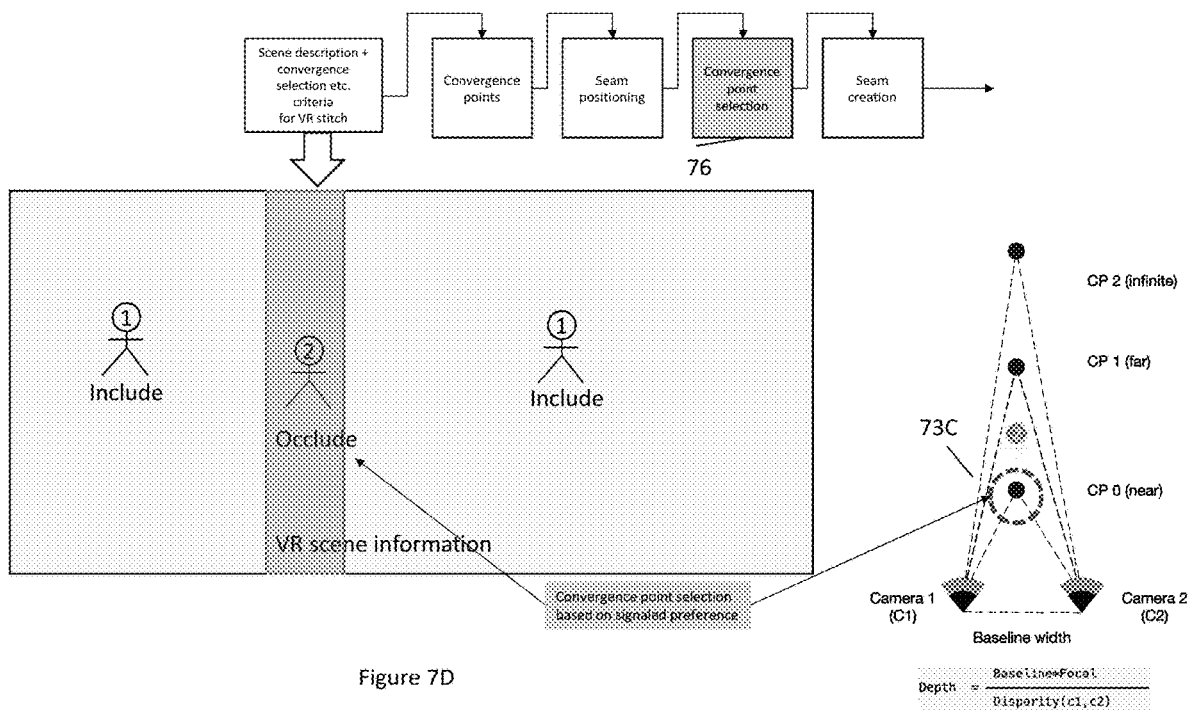
Figure 7E:
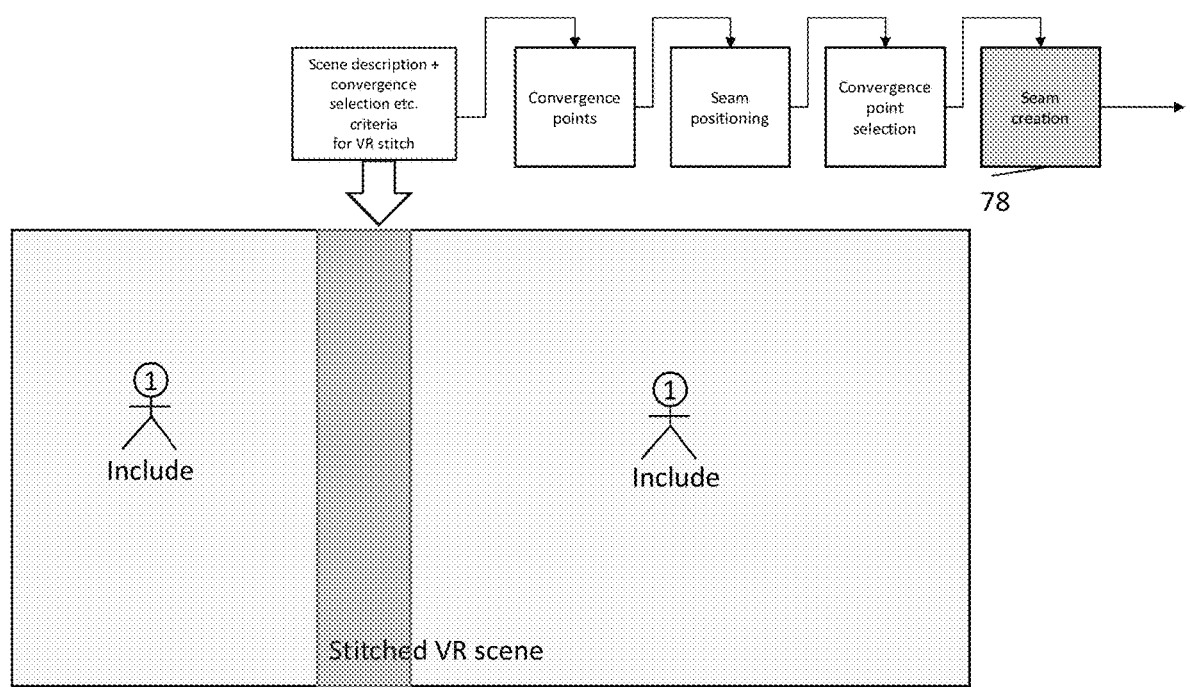
Figure 7F:
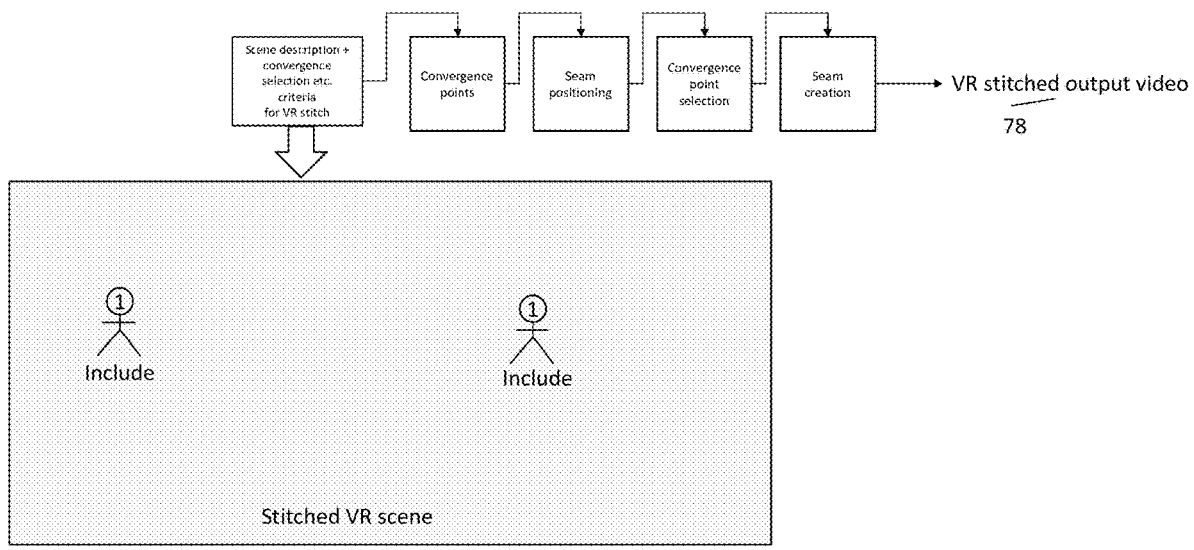
Figure 8:
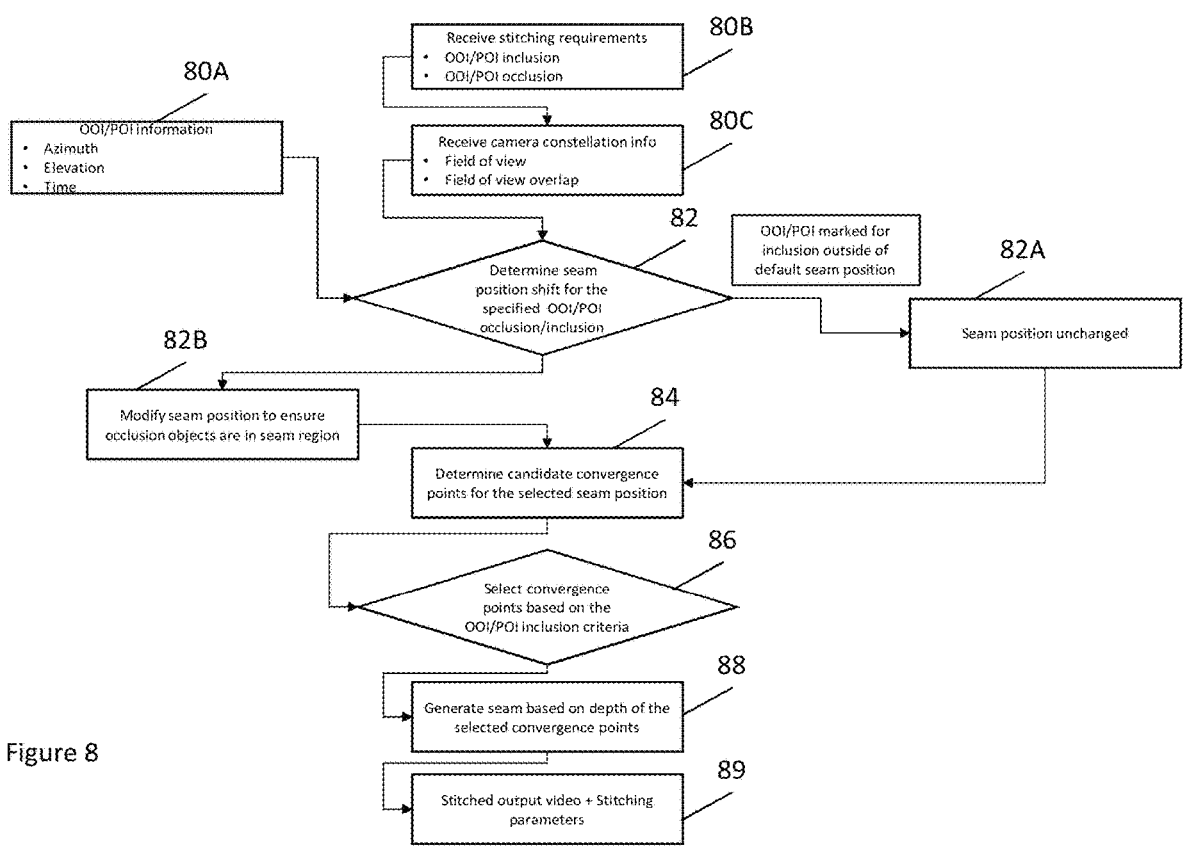

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be deployed;

FIG. 2 is a block diagram of an apparatus that may be specifically configured in accordance with an example embodiment of the present disclosure;

FIG. 3 is a flowchart illustrating a set of operations performed, such as by the apparatus of FIG. 2, in accordance with an example embodiment of the present disclosure;

FIG. 4 is a flowchart illustrating a set of operations performed, such as by the apparatus of FIG. 2, in accordance with an example embodiment of the present disclosure;

FIG. 5 depicts an example architecture in which implementations in accordance with an example embodiment of the present invention may be deployed;

FIG. 6 illustrates an example stitching scenario in accordance with an example embodiment of the present disclosure;

FIGS. 7A to 7F illustrate a set of operations performed, such as by the apparatus of FIG. 2, in accordance with an example embodiment of the present disclosure; and FIG. 8 is a flowchart illustrating a set of operations performed, such as by the apparatus of FIG. 2, in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment to provide a signaling mechanism that could be utilized in conjunction with a media interface and exchange mechanism in a media processing pipeline defined in Moving Picture Experts Group-I (MPEG-I) Network-based media processing (NBMP). In particular, a method, apparatus and computer program product are provided in accordance with an example embodiment to provide a NBMP media interface mechanism that enables virtual reality (VR) stitching within an NBMP-enabled system independent of the stitching algorithm that is used.

The method, apparatus and computer program product may be utilized in conjunction with a variety of video formats including High Efficiency Video Coding standard (HEVC or H.265/HEVC), Advanced Video Coding standard (AVC or H.264/AVC), the upcoming Versatile Video Coding standard (VVC or H.266/VVC), and/or with a variety of video and multimedia file formats including International Standards Organization (ISO) base media file format (ISO/IEC 14496-12, which may be abbreviated as ISOBMFF), MPEG-4 file format (ISO/IEC 14496-14, also known as the MP4 format), file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). ISOBMFF is the base for derivation of all the above mentioned file formats. An example embodiment is described in conjunction with the HEVC, however, the present disclosure is not limited to HEVC, but rather the description is given for one possible basis on top of which an example embodiment of the present disclosure may be partly or fully realized.

Network-based 360 virtual reality (VR) stitching is a use case for MPEG-I NBMP standardization. NBMP requires an interoperable media format for enabling cloud based processing of multimedia content, such as for resource intensive and latency sensitive use cases. NBMP aims to enable closer to the edge processing modules for low latency ingestion, processing and delivery of the desired media as output.

In general, all stitching approaches include some standard operations such as image alignment and composition. There are techniques, such as direct pixel matching or feature-based registration approaches, to align adjacent frames (2 in a horizontal camera rig setup, or more frames in a spherical camera rig setup). The composition is the step to warp frames into a final compositing surface. The seam region is pixel-level blended from multiple overlapped adjacent frames.

Panoramic (360 degree) stitching is a process of constructing a panoramic image, either monoscopic or stereoscopic, by combining imagery from multiple cameras having different camera lens positions. Given a constraint rig configuration with multiple camera lenses, left and right perspective equirectangular (or other projections) images are created from strips from adjacent cameras utilizing known camera calibration parameters and a desired stereoscopic output disparity. However, parallax from stitching multiple images may lead to disturbing artefacts (e.g. seams), such as in the form of discontinuities, between the stitched strips. Some approaches for addressing these artefacts include blending between strips using different strategies such as fast linear gradient-domain approaches or slow approaches such as depth or optical flow.

In the stitching process, key information such as camera parameters, and objective and subjective requirements that may take the form of configuration parameters for the stitching process are required. In addition, the content used for stitching may be fragmented and heterogeneous. For example, some content made available for stitching could be captured from a single-body camera, multiple fish eye cameras, or a set of cameras on a rig. The cameras from different sources may not be synchronized and may not be formatted uniformly. Therefore, input source content parameters which may include media data ingestion identifiers that indicate the content properties of content from different sources are important for the stitching process in order to perform the stitching efficiently and with a minimal amount of errors. Signaling of the camera parameters, configuration requirements, and input source content parameters are independent of the VR stitching operation itself.

As illustrated in FIG. 1, NBMP clients 102A and 102B may transfer media content such as videos to NBMP server 106A. The NBMP clients 102A and 102B may be any device that is capable of capturing an object or scene such as any form of camera including a camera included with any type of computing device (e.g., a mobile device). The NBMP server 106A may be a server configured to process, including but not limited to stitch, the media content provided by the NBMP clients 102A and 102B. The NBMP clients 102A and 102B are provided as an example. However, there may be one or more NBMP clients. The media content is provided in accordance with an NBMP interface 104. The NBMP interface 104 may be a NBMP media interface mechanism that enables virtual reality (VR) stitching within an NBMP-enabled system independent of the stitching algorithm used on NBMP server 106A. The NBMP server 106A may provide the media content to another NBMP server 106B to offload the stitching task if needed.

FIG. 2 illustrates an example apparatus that may be provided to embody the NBMP client or the NBMP server. As illustrated in FIG. 2, the apparatus 10 of an example embodiment includes, is associated with or is otherwise in communication with processing circuitry 12, a memory 14, a communication interface 16 and optionally, a user interface 18. Some components, such as the camera in a NBMP client, are not illustrated in FIG. 2.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to encode the video bitstream, the apparatus 10 may optionally include a user interface 18 that may, in turn, be in communication with the processing circuitry 12 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

Turning now to FIG. 3, the operations performed by the NBMP client 102 in accordance with an example embodiment are illustrated. As shown in block 20, the NBMP client 102 includes means, such as a camera and/or the processing circuitry 12, for capturing media content. The media content comprises one or more videos. As shown in block 22, NBMP client 102 includes means, such as the communication interface 16 and/or the processing circuitry 12, for transferring the media content in accordance with a network-based media processing interface mechanism.

Similarly, as illustrated in FIG. 4, the operations performed by the NBMP server 106 in accordance with an example embodiment are illustrated. As shown in block 30, the NBMP client 102 includes means, such as the communication interface 16 and/or the processing circuitry 12, for receiving media content. The media content comprises one or more videos and the media content is transferred in accordance with a network-based media processing interface mechanism. As shown in block 32, the NBMP server 106 includes means, such as the processing circuitry 12, for stitching the one or more videos into one or more stitched videos. The stitched videos may be panoramic videos. Details regarding stitching the one or more videos into one or more stitched videos are described later in conjunction with FIGS. 5 to 8.

As shown in block 34, the NBMP server 106 includes means, such as the processing circuitry 12 and/or the communication interface 16 for transferring the one or more stitched videos. The one or more stitched videos may be transferred to a playback device, another NBMP server, or a media sink client. The playback device may be any device capable of playing the stitched videos or any device connected to a device capable of playing the stitched video, such as a virtual reality headset, a playback server, a computer, a video playback device, a game console, a mobile device, and/or the like.

The NBMP media interface mechanism may enable seam position shifting in combination with convergence point(s) selection criteria in order to obtain the desired VR stitch. The desired VR stitch may be obtained by facilitating inclusion or occlusion of specified objects or persons of interest (OOI/POI). At a general level, the following information may be signaled to NBMP server 106 or any other VR stitching entity: OOI/POI that should prioritized or should occluded, seam freedom extent (e.g., in degrees) or field of view overlap, and scene OOI/POI information (azimuth, elevation, timestamp, ID for each OOI/POI, etc.).

The NBMP media interface mechanism may further define an interoperable media format which describes the input source content and the output product parameters. The output product parameters are prescriptive VR stitching parameters which are utilized for network based VR stitching. A stitched video is based on the requirements derived from the prescriptive parameters. The input source content parameters enable utilization of diverse and heterogeneous content (such as videos, images, etc.) made available to the network based VR stitching system, such that the VR stitching process can efficiently generate the stitched output.

In some embodiments, the input format description for the media content provided by the NBMP client is signalled in-band with the source content or out-of-band in formats, such as JavaScript Object Notation (JSON), Extensible Markup Language (XML), Session description Protocol (SDP), and/or binary format.

In some embodiments, if the NBMP client is a capturing rig setup with multiple cameras, a depth-based approach to existing stereoscopic panorama stitching configurations, as well as content-creator defined lens preferences and other scene-specific semantic information to minimize the artefacts in the seam regions may be utilized. The signalling of the output prescription parameters or metadata to describe the requirements and parameters is defined in a specific schema that implements the NBMP generic schema.

In some embodiments, the NBMP media interface mechanism may define that the following information may be sent to the NBMP server 106:

Center location of the point of interest (azimuth, elevation) and/or the collection of central orientations over time. The stitched panorama is centered based on the input angle(s). For example, an important point of interest is located in the center of the stitched image to reduce the effect of projection. Some transition effects can be added or signaled at the angle switching points. The signaling of the main camera and the direction out of the multiple cameras which often comprise a VR capture set up.

Camera parameters: camera lens model including intrinsic and extrinsic values

Inter pupil distance (IPD)

In some embodiments, some additional features on the NBMP client 102 which may further enhance the operation efficiency of the NBMP server 106 may be included. Examples include:

AI enabled encoding of camera source streams with embedded object tracking information in order to obtain OOI/PIO scene information without the need to decode and analyze the incoming source content for VR stitching.

Capture cameras with substantial field of view overlap increase the flexibility of the VR stitch scene shaping by providing greater freedom to move the seam.

The input parameter also provides the ingestion source and the media characteristics. The synchronization status also helps in improving efficiency of the stitching workflow definition in NBMP scope.

Turning now to FIG. 5, an example architecture for VR stitching is illustrated. The NBMP client 102 serves as a video controller client which initiates the VR stitching request and transfers the media content in accordance with the NBMP interface mechanism. The NBMP client 102 signals information which enables the server to perform VR stitching with efficient use of resources as well as to make design choices based on the parameters delivered by the NBMP client 102. The NBMP interface mechanism defines data that needs to be delivered by the NBMP client 102. Example sets of data defined by the NBMP interface mechanism include ingestion content properties, with examples of ingestion content properties being provided below:

Ingestion content properties:
<protocol><URI>/<Description format>
RTSP/HTTP/, URI comprising IP-address/DNS-name, XML/SDP/JSON
Contributing source content information regarding one or more cameras (e.g., camera constellation)
Camera constellation:
Intrinsic parameters
Extrinsic parameters Each camera or camera constellation image sensor shutter type OOI/POI information (in terms of azimuth, elevation to the center of each OOI/POI)

Camera constellation synch-skew (0 if in synch, milliseconds for out of synch, −1 if not known)

Capture settings (e.g., ambient light, exposure, etc.)

Per image sensor track identifier (stereo/mono)

Media/video frame rate control (FPS per input), as capturing devices can have different rates, in terms of chunk sizes/segment durations Media coding and delivery properties
  Codec
  Segments/Elementary-stream
  Frame rate/bitrate/etc.

The URI is a Uniform Resource Identifier (URI), Uniform Resource Locator (URL), or Uniform Resource Name (URN) that defines the location and protocol for obtaining the content for stitching. The contributing source content information regarding one or more cameras provides contributing camera sensor and capture properties and content scene information (objects of interest, their location, and the like). In addition, camera sensor synchronization information which indicates whether the server should first align the content from different cameras in the constellation or not, before initiating the stitching process may be provided. Camera sensor synchronization information enables efficient use of resources on the server. In some embodiments, a synchronization algorithm may be used in case of no-synchronizaton (e.g., first use audio based temporal alignment followed by visual registration) for computational efficiency.

Example sets of data defined by the NBMP interface mechanism include stitching input parameters with examples of stitching input parameters being provided below:

Seam position selection criteria
  Default seam position (e.g., in terms of degrees)
  Seam thickness
  Seam_extent_of_freedom (e.g., overlap in adjacent views in terms of degrees)

Convergence point selection criteria
  Convergence steps_preview
  Per object object_inclusion_flag or preference
  Per object object_occlusion_flag or preference Regarding seam selection and convergence point selection based on the signalled preferences by the NBMP client 102, seam position selection depends on the content capture and delivery format. Having objects of interest by default outside the stitching seam avoids any risk of distortion. Stitching the seam provides an opportunity to modify the scene. Furthermore, the determination of convergence points indicates the depth information at the seam. The determination of convergence points can be utilized in conjunction with the OOI/POI preference information to select the pixels for the seam. Example seam selection information includes default seam position which indicates the seams for a given camera constellation, thickness in terms of degrees, width of the seam, and the like.

A thicker seam provides greater flexibility in terms of scene shaping but also necessitates more computational resources. Location and thickness could be adjusted based on per_object_flag. In some embodiments, the object_inclusion_flag indicates whether the convergence point should be included or excluded. In some embodiments, instead of using a flag, weighting may be utilized.

An example set of stitching parameters data is provided below in the JSON Schema format:

```
"stitching_parameters": {
    "type": "object",
    "description": "Parameters for stitcher",
    "properties": {
        "seamlocations": {
            "type": "array",
            "description": "Output panorama interpolated area locations in degrees",
            "items": {
                "type": "number",
                "length": 8,
                "default": [0,0,0,0,0,0,0,0]
            },
        "seamthickness": {
            "type": "array",
            "description": "seam region thickness in pixels",
            "items": {
                "type": "number",
                "length": 8,
                "default": [10,10,10,10,10,10,10,10]
            },
        "seam_extent_of_freedom": {
            "type": "array",
            "description": "Seam freedom constraint in degrees",
            "items": {
                "type": "number",
                "length": 8,
                "default": [60,60,60,60,60,60,60,60]
            },
        "exclude_objects": {
            "type": "array",
            "description": "Objects need to be excluded",
            "items": {
                "type": "number",
                "length": 5,
                "object_id": [object_id1,object_id2,object_id3,object_id4,object_id5]
            },
        "include_objects": {
```

```
            "type": "array",
            "description": "Objects need to be included",
            "items": {
                "type": "number",
                "length": 5,
                "object_id": [object_id6,object_id7,object_id8,object_id9,object_id10]
            },
            "object_weights": {
                "type": "array",
                "description": "Object importance weights in the scale of 100. Zero means the least importance",
                "items": {
                    "type": "number",
                    "length": 5,
                    "object_id": [object_id1=100,object_id7=5,object_id8=10,object_id2=70,object_id5=80]
                }
            },
            "framepacktype": {
                "type": "string",
                "enum": [
                    "TopBottom",
                    "SideBySide"
                ],
                "default": "TopBottom"
            }
        },
        "required": [ ]
    },
```

The meaning of most of the parameters is embedded in the code in the description field. Additionally, framepacktype indicates the type for the frame type which in this embodiment include top and bottom or side by side.

As illustrated in block 40 of FIG. 5, to perform stitching, the NBMP server 106 starts with determination of convergence points for the overlapping region. This provides general scene geometry information to assist in making stitching decision. The information regarding the camera field of view overlaps and the default seam information can be used for stitching.

A VR stitching sample workflow definition in NBMP-like format is provided below to show the abovementioned stitch parameters. A generic media processing function in NBMP contains schema blocks such as inputSpec, OutputSpec and ParamsSpec. A VR stitch workflow defines the actual values of the input, output and parameters. The example below groups all parameter schemas into "camera_parameters", "stitching_parameters", and "output_parameters", respectively, for the sake of readability. The actual sample value under "params" property demonstrates part of the all parameters for the VR stitching service.

```
{
    "version": "1.0.0-alpha",
    "name": "vr-stitching",
    "blocks": [
    ...
    {
        "blockName": "stitcher",
        "inputs": {
            "control": "vr-stitching.stitcher_control.runtime_control",
            "video": "vr-stitching.video_in.out"
        },
        "outputs": {
            "out": "vr-stitching.stitcher.out"
        },
        "functionSpec": {
            "functionName": "stitcher",
            "version": "1.0.0",
            "paramsSpec": {
                "camera_parameters": {
                    "required": true,
                    "schema": "#vr_stitching_schema/camera_parameters"
                },
                "stitching_parameters": {
                    "required": true,
                    "schema": "#vr_stitching_schema/stitching_parameters"
                },
                "output_parameters": {
                    "required": true,
                    "schema": "#vr_stitching_schema/output_parameters"
                }
            },
            "outputSpec": {
                "out": {
                    "type": "video",
                    "default": true,
                    "schema": "#vr_stitching_schema/stitcher_video"
                }
            },
            "inputSpec": {
                "control": {
                    "type": "event",
                    "defaut": false,
                    "schema": "#vr_stitching_schema/stitching_parameters"
                },
                "in": {
                    "type": "bitstream",
                    "default": true,
                    "schema": "#vr_stitching_schema/stitcher_fisheye"
                }
            }
        },
        "params": {
            "stitching_parameters": {
                "seamlocations": [-115,-90,-55,-30,30,55,90,115],
                "framepacktype": "TopBottom"
            },
            "output_parameters": {
                "type": "stereoscopic",
                "format": {
                    "quality": "high",
                    "container": "OMAF",
                    "contentType": "video/mp4;codecs=" profiles="",
                    "type": "video",
```

```
            "encoder": "h265/hevc"
          }
        },
        "camera_parameters": {
          "extrinsics": [
            {
              "rotation": [0, 0, 0],
              "translation": [0, 0, 0]
            },
            {
              "rotation": [0, 0, 0],
              "translation": [0, 0, 0]
            },
            {
              "rotation": [0, 0, 0],
              "translation": [0, 0, 0]
            }
          ],
          "intrinsics": [
            {
              "principal_point": [512, 512],
              "height": 1024,
              "width": 1024,
              "type": "fisheye",
              "disto": [ ],
              "focal": 151.5
            }
          ]
        }
      }
    }
  ]
}
```

FIG. 6 illustrates an example stitching scenario. Depending on the field of view overlap, the seam location can be shifted and the thickness can be adjusted based at least on scene shaping requirements. For example, a seam overlapping a particular OOI can be used to modify pixel selection in the seam such that the particular OOI can be included or excluded. An OOI can be located at a smaller depth compared to one convergence point but greater depth compare to second convergence points. Consequently, this can be used to select a particular convergence point for inclusion or occlusion of an OOI from the seam. As shown in block 42, the NBMP server 106 performs stitching and the stitched media content may be provided to a media sink client 46. Details regarding the media sink client 46 are described later.

FIGS. 7A to 7F illustrate stitching parameter preference dependent seam shifting and convergence point selection. In some embodiments, OOI/POI information is received from the NBMP client 102. The stitching preference information and the camera field of view overlap provides the extent of freedom for positioning the seam and prioritizing a particular convergence point. In some embodiments, there can also be a verification loop to check if a particular OOI inclusion or occlusion has been successful.

FIG. 7A provides an overview of the process. As illustrated in block 70, scene description information, convergence selection information, and information indicating criteria for a VR stitch are provided in accordance with the NBMP interface.

FIG. 7B illustrates the convergence points as shown in block 72. By way of example, as illustrated in 73A and 73B, camera 1 C1 and camera 2 C2 are provided. The distance between the two cameras is the baseline width of the cameras. Convergence is the area (or a pixel) of one seam region that is interpolated from original input. Different convergence determines the blending effects or weights with respect to the pixel distances to camera centers. Occlusion happens by projecting one pixel from one camera only, based on the given convergence values and estimated depth values from two camera centers. Convergence can be defined by the estimated depths and the number of convergences can also be defined manually; or estimated by the disparities of matched pixel pairs in given frames. Three convergence points, 73C, 73D and 73E are illustrated in this example. The overlap region for the two cameras is illustrated in block 73F.

FIG. 7C illustrates example seam positioning as shown in block 74. An example seam is shown in block 75. FIG. 7D illustrates an example convergence point selection as shown in block 76. In this case, convergence point 73C is selected. The convergence point selection may be based on a preference signaled in accordance with the NBMP interface. FIG. 7E illustrates an example seam creation as shown in block 78. FIG. 7F illustrates that media content including one or more VR stitched output videos are provided.

The media sink client 46 is registered with the NBMP server 106 and signals the required output format parameters to ensure that the VR stitched output media content produced by the NBMP server 106 can be consumed by a playback device. In some embodiments, the required output format parameters may be additionally or alternatively signalled by the NBMP client 102. An example of the output format parameters is shown below:

```
"output_parameters": {
  "type": "object",
  "description": "Output parameters",
  "properties": {
    "type": {
      "type": "string",
      "enum": [
        "monoscopic",
        "stereoscopic"
      ],
      "default": "monoscopic",
      "description": "Stereo or mono output type"
    },
    "oneOf": [
      {
        "format": {
          "type": "string",
          "default": "video",
          "description": "video output format"
        },
        "encoder": {
          "type": "string",
          "default": "h265",
          "description": "encoder name"
        },
        "packager": {
          "type": "string",
          "default": "MPEG-DASH",
          "description": "packaging format"
        },
        "quality": {
          "type": "string",
          "enum": [
            "ultrahigh",
            "high",
            "normal",
            "low"
          ],
          "default": "normal",
          "description": "high-level encoding quality control"
        }
      },
      {
        "format": {
          "type": "string",
          "default": "image",
          "description": "image output format"
```

```
            }
          }
        ]
      },
      "required": [
        "type",
        "format"
      ]
    }
  }
}
```

The meaning of the parameters are embedded in the code in the respective description field.

FIG. 8 is a flowchart illustrating stitching parameter dependent seam shifting and convergence point selection in the stitching process performed by the NBMP server 106.

As illustrated in blocks 80A, 80B and 80C, the NBMP server 106 includes means, such as the processing circuitry 12, the communication interface 16 or the like, configured to receive, in accordance with the NBMP interface mechanism, stitching requirements, OOI and POI information, and camera constellation information. As shown in block 82, the NBMP server 106 includes means, such as the processing circuitry 12 or the like, configured to determine seam position shift for the specified OOI/POI occlusion/inclusion. OOI/POI outside of default seam position may be marked for inclusion. If the seam positions do not need to be changed, as shown in block 82A, the NBMP server 106 includes means, such as the processing circuitry 12 or the like, configured to determine candidate convergence points for the selected seam position as illustrated in block 84. If the seam positions do need to be changed, the NBMP server 106 includes means, such as the processing circuitry 12 or the like, for modifying the seam position to ensure occlusion objects are in the seam region as shown in block 82B and then determine candidate convergence points for the selected seam position as illustrated in block 84.

As shown in block 86, the NBMP server 106 includes means, such as the processing circuitry 12 or the like, configured to select convergence points, such as based on the OOI/POI inclusion criteria. After the NBMP server 106 selects the candidate convergence points for the selected seam position, as illustrated in block 88, the NBMP server 106 includes means, such as the processing circuitry 12 or the like, configured to generate seam based on depth of the selected convergence points. Then the NBMP server 106 includes means, such as the processing circuitry 12 or the like, configured to generate the stitched output video as illustrated in block 89. The NBMP server 106 may output the stitched output video along with stitching parameters as previously described in conjunction with FIG. 4.

As described above, FIGS. 3-8 include flowcharts of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3-8. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
capturing media content, wherein the media content comprises one or more videos; and
transferring the media content in accordance with a network-based media processing interface mechanism, wherein the network-based media processing interface mechanism defines a set of stitching input parameters to be transferred along with the media content, the set of stitching input parameters comprising at least one of seam position selection criteria or convergence point selection criteria.

2. The method according to claim 1, wherein the set of stitching input parameters further comprises a weighting, and wherein the network-based media processing interface mechanism defines a set of ingestion content properties to be transferred along with the media content.

3. The method according to claim 2, wherein the set of ingestion content properties comprises contributing source content information.

4. The method according to claim 1, wherein the seam position selection criteria comprises a default seam position, a seam thickness, and a seam extent of freedom.

5. An apparatus comprising at least one processor and at least one memory comprising computer program code for one or more programs, the at least one memory and the computer program code configured to, with the at least one processor, cause the apparatus at least to:
capture media content, wherein the media content comprises one or more videos; and
transfer the media content in accordance with a network-based media processing interface mechanism, wherein the network-based media processing interface mechanism defines a set of stitching input parameters to be transferred along with the media content, the set of stitching input parameters comprising at least one of seam position selection criteria or convergence point selection criteria.

6. The apparatus according to claim 5, wherein the set of stitching input parameters comprises further comprises a weighting, and wherein the network-based media processing interface mechanism defines a set of ingestion content properties to be transferred along with the media content.

7. The apparatus according to claim 6, wherein the set of ingestion content properties comprises contributing source content information.

8. The apparatus according to claim 5, wherein the seam position selection criteria comprises a default seam position, a seam thickness, and a seam extent of freedom.

9. A method comprising:
receiving media content, wherein the media content comprises one or more videos, wherein the media content is transferred in accordance with a network-based media processing interface mechanism, wherein the network-based media processing interface mechanism defines a set of stitching input parameters to be transferred along with the media content, the set of stitching input parameters comprising at least one of seam position selection criteria or convergence point selection criteria; and
stitching the one or more videos into one or more stitched videos.

10. The method according to claim 9, wherein the set of stitching input parameters further comprises a weighting, and wherein the network-based media processing interface mechanism defines a set of ingestion content properties to be transferred along with the media content.

11. The method according to claim 10, wherein the set of ingestion content properties comprises contributing source content information.

12. The method according to claim 9, wherein the seam position selection criteria comprises a default seam position, a seam thickness, and a seam extent of freedom.

13. An apparatus comprising at least one processor and at least one memory comprising computer program code for one or more programs, the at least one memory and the computer program code configured to, with the at least one processor, cause the apparatus at least to:
receive media content, wherein the media content comprises one or more videos, wherein the media content is transferred in accordance with a network-based media processing interface mechanism, and wherein the network-based media processing interface mechanism defines a set of stitching input parameters to be transferred along with the media content, the set of stitching input parameters comprising at least one of seam position selection criteria or convergence point selection criteria; and
stitch the one or more videos into one or more stitched videos.

14. The apparatus according to claim 13, wherein the set of stitching input parameters further comprises a weighting, and wherein the network-based media processing interface mechanism defines a set of ingestion content properties to be transferred along with the media content.

15. The apparatus according to claim 14, wherein the set of ingestion content properties comprises contributing source content information.

16. The apparatus according to claim 13, wherein the seam position selection criteria comprises a default seam position, a seam thickness, and a seam extent of freedom.

* * * * *

UNITED STATES PATENT AND TRADEMARK OFFICE
CERTIFICATE OF CORRECTION

| | | |
|---|---|---|
| PATENT NO. | : 10,861,132 B2 | Page 1 of 1 |
| APPLICATION NO. | : 16/507459 | |
| DATED | : December 8, 2020 | |
| INVENTOR(S) | : You et al. | |

It is certified that error appears in the above-identified patent and that said Letters Patent is hereby corrected as shown below:

In the Claims

Column 19, Claim 6, Line 45:
"stitching input parameters comprises further comprises a" should read --stitching input parameters further comprises a--

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*